United States Patent
Gupta

(10) Patent No.: US 11,436,500 B2
(45) Date of Patent: Sep. 6, 2022

(54) SCHEMA CORRESPONDENCE RULE GENERATION USING MACHINE LEARNING

(71) Applicant: PeerNova, Inc., San Jose, CA (US)

(72) Inventor: Kartik Gupta, New York, NY (US)

(73) Assignee: PEERNOVA, INC., San Jose, CA (US)

( * ) Notice: Subject to any disclaimer, the term of this patent is extended or adjusted under 35 U.S.C. 154(b) by 453 days.

(21) Appl. No.: 16/705,132

(22) Filed: Dec. 5, 2019

(65) Prior Publication Data

US 2021/0174219 A1 Jun. 10, 2021

(51) Int. Cl.
*G06F 16/00* (2019.01)
*G06N 5/02* (2006.01)
(Continued)

(52) U.S. Cl.
CPC ........... *G06N 5/022* (2013.01); *G06F 16/258* (2019.01); *G06F 16/285* (2019.01); *G06N 5/04* (2013.01); *G06N 20/00* (2019.01)

(58) Field of Classification Search
CPC ........ G06F 17/18; G06F 21/604; G06F 21/62; G06F 16/26; G06F 16/285; G06F 16/2471; G06F 16/254; G06F 2221/2151; G06F 40/58; G06F 16/2228; G06F 16/355; G06F 16/38; G06F 16/9024; G06F 16/22; G06F 16/243; G06F 16/258; G06F 16/28; G06F 16/35; G06F 16/382; G06F 21/6254; G06F 40/30; G06F 40/51; G06F 40/174; G06F 16/3331; G06F 16/951; G06F 16/211; G06F 40/16; G06F 16/90335; G06F 16/9035; G06F 16/904; G06F 40/194; G06F 40/40;
(Continued)

(56) References Cited

U.S. PATENT DOCUMENTS 8,577,857 B2 * 11/2013 Nikovski .............. G06F 16/211
707/705
10,817,657 B2 * 10/2020 Akyamac ............... G06N 3/088
(Continued)

OTHER PUBLICATIONS

Damerau-Levenshtein distance, last edited on Nov. 29, 2019 in *Wikipedia*, 2019, 6 pages, [Online][Retrieved Jan. 13, 2020], Retrieved from the internet <URL:https://en.wikipedia.org/wiki/Damerau%E2%80%93Levenshtein_distance>.

(Continued)

*Primary Examiner* — Yicun Wu
(74) *Attorney, Agent, or Firm* — Fenwick & West LLP

(57) ABSTRACT

A schema matching system processes training event data received from multiple sources to determine correspondence rules associating fields in the schemas of each source. To generate the correspondence rules, the schema matching system can use training event data from multiple sources comprising events associated with multiple schemas. Then, based on one or more similarity metrics between data entries of the training event data, the system matches individual events using a machine learning algorithm and, based on the pairs of matching events, corresponding schema fields across the multiple schemas. Based on the matching events and/or user feedback, the schema matching system can generate one or more correspondence rules based on the normalization rules and the corresponding fields of the schemas for later use by one or more transaction monitoring systems on incoming event data.

20 Claims, 11 Drawing Sheets

(51) Int. Cl.
*G06F 16/28* (2019.01)
*G06N 5/04* (2006.01)
*G06N 20/00* (2019.01)
*G06F 16/25* (2019.01)

(58) Field of Classification Search
CPC .... G06F 11/008; G06F 16/116; G06F 16/213; G06F 16/24564; G06F 16/283; G06F 16/335; G06F 16/84; G06F 16/90; G06F 16/901; G06F 16/95; G06F 16/954; G06F 21/554; G06F 21/577; G06F 21/6218; G06F 2221/034; G06F 2221/2101; G06F 40/177; G06F 40/02; G16H 50/70; G16H 10/60; G16H 50/20; G16H 20/40; G16H 30/00; G16H 80/00; G16H 10/20; G16H 20/10; G16H 10/40; G16H 15/00; G16H 30/40; G16H 10/00; G16H 30/20; G16H 40/20; G16H 50/30; G16H 50/50; G16H 70/20

See application file for complete search history.

(56) References Cited

U.S. PATENT DOCUMENTS

| | | | |
|---|---|---|---|
| 11,249,960 B2* | 2/2022 | Dean | G06F 16/258 |
| 2005/0278139 A1* | 12/2005 | Glaenzer | G06K 9/6292 |
| | | | 702/179 |

OTHER PUBLICATIONS

Feigenbaum, J.J., "A Machine Learning Approach to Census Record Linkage," Department of Economics, Harvard University, Mar. 28, 2016, pp. 1-34.

Jaro—Winkler distance, last edited on Nov. 18, 2019 in *Wikipedia*, 2019, 3 pages, [Online] [Retrieved Jan. 13, 2020], Retrieved from the internet <URL:https://en.wikipedia.org/wiki/Jaro%E2%80%93Winkler_distance>.

Levenshtein distance, last edited on Dec. 17, 2019 in *Wikipedia*, 2019, 8 pages, [Online], [Retrieved Jan. 13, 2020], Retrieved from the internet <URL:https://en.wikipedia.org/wiki/Jaro%E2%80%93Winkler_distance>.

Longest common subsequence problem, last edited on Dec. 31, 2019 in *Wikipedia*, 2019, 12 pages, [Online][Retrieved Jan. 13, 2020], Retrieved from the internet <URL:https://en.wikipedia.org/wiki/Longest_common_subsequence_problem>.

R-FORGE, "RecordLinkage," 1 page, [Online][Retrieved Jan. 13, 2020], Retrieved from the internet <URL: https://r-forge.r-project.org/projects/recordlinkage/>.

Sariyar, M. and Borg, A., "The RecordLinkage Package: Detecting Errors in Data," *The R Journal*, vol. 2/2, December 1010, pp. 61-67.

Soundex, last edited on Dec. 23, 2019 in *Wikipedia*, 2019, 4 pages, [Online][Retrieved Jan. 13, 2020], Retrieved from the internet <URL:https://en.wikipedia.org/wiki/Soundex>.

Zimmerman, D. and Kang, K., "Clustering Linkage functions in Record Linkage," Carnegie Mellon University Department of Statistics Census Research Node for National Science Foundation, pp. 1-11.

\* cited by examiner

Direct Match: ID: A123456
Entry
510A

Order No: A123456
Direct Match
515A

Partial Match: ID: AB123456
Entry
510B

Order: A1234-56B
Partial Match
515B

Phonetic Match: Name: John Smith
Entry
510C

N: Jon Smyth
Phonetic Match
515C

FIG. 5

Initial Pair 620

| | Account ID | Order ID | Quantity | Buy/Sell |
|---|---|---|---|---|
| Event A 622 | ABC123456 | 98765 | 100 | BUY |
| Event B 624 | 000123456 | 98765 | 100ct | B |
| Similarity | .82 | 1.0 | .95 | .91 |

Initial Match 610

FIG. 6A

Normalized Pair 640

| | Account ID | Order ID | Quantity | Buy/Sell |
|---|---|---|---|---|
| Normalized Event A 642 | 123456 | 98765 | 100 | B |
| Normalized Event B 644 | 123456 | 98765 | 100 | B |
| Similarity | 1.0 | 1.0 | 1.0 | 1.0 |

Normalized Match 630

FIG. 6B

SCHEMA CORRESPONDENCE RULE GENERATION USING MACHINE LEARNING

BACKGROUND

The present disclosure generally relates to identifying correspondences between events with different schemas and, in particular, to automatically matching corresponding data fields between schemas.

Entities like financial institutions process many transactions on a daily basis. Each transaction involves multiple steps and processes. For example, the transfer of funds from a first account to a second account can involve events recording steps validating that the first and second accounts exist, verifying that the user that initiated the transfer is authorized to make the request, checking if the first account has sufficient funds for the transfer, determining whether the amount of the transfer exceeds an established limit, analyzing the transfer for characteristics of money laundering, or other similar steps. In addition, modern transaction processing may occur across many different systems, each performing a separate part of the processing for a single transaction. Each system can record data relevant to the transaction in different data storage schema. As a result, the processing of a single transaction may generate many types of events from multiple different systems. Therefore, tracking a single transaction as it is processed, determining the transaction lineage across multiple systems, and correlating events related to the processing of a particular transaction across the systems may require the use of specialized "correspondence rules" to associate events received from different systems as related to one another and belonging to the same transaction.

However, a set of correspondence rules needs to be generated for each group or pair of systems across which a transaction is processed. Previous methods of generating correspondence rules can require user analysis of the schema of each system and the manual association of different data entries in various events by the user. This process can be error-prone and may need to be repeated for each new system introduced to the processing of transactions.

SUMMARY

A schema matching system processes training event data received from multiple sources to determine correspondence rules associating fields describing the same data in the events received from each source. Each event may represent a state or portion of processing for completing one or more transactions by a source. Events can include event data describing a state or condition of the transaction after processing by the source as a series of data entries organized according to a specific schema of the source of the event. The event data may thus describe a category of the event, processing codes, data values, and other event data according to the source's schema.

To generate the correspondence rules, the schema matching system can use training event data from multiple sources comprising events associated with each of a set of schemas. Then, based on one or more similarity metrics between data entries of the training event data, the schema matching system can match individual events (for example, based on multiple similar or directly corresponding data entries in two events associated with the same transaction) using a machine learning algorithm and, based on the sets of matching events, corresponding schema fields across the multiple schemas. Based on the sets of matching events and/or user feedback, the schema matching system can generate or revise normalization rules modifying the data entries of each received event to make the matches between events more exact and/or representative of the relationship between the schemas of the matching events. After one or more iterations of this process of analyzing training event data, the schema matching system generates one or more correspondence rules based on the normalization rules and the determined corresponding fields of the schemas for later use by one or more transaction monitoring systems on incoming event data.

BRIEF DESCRIPTION OF THE DRAWINGS

FIG. 5 illustrates example similarity metrics between data entries, according to an embodiment.

FIG. 6A illustrates an example match between two events, according to an embodiment.

FIG. 6B illustrates an example normalized match between two events, according to an embodiment.

Figure 1A:
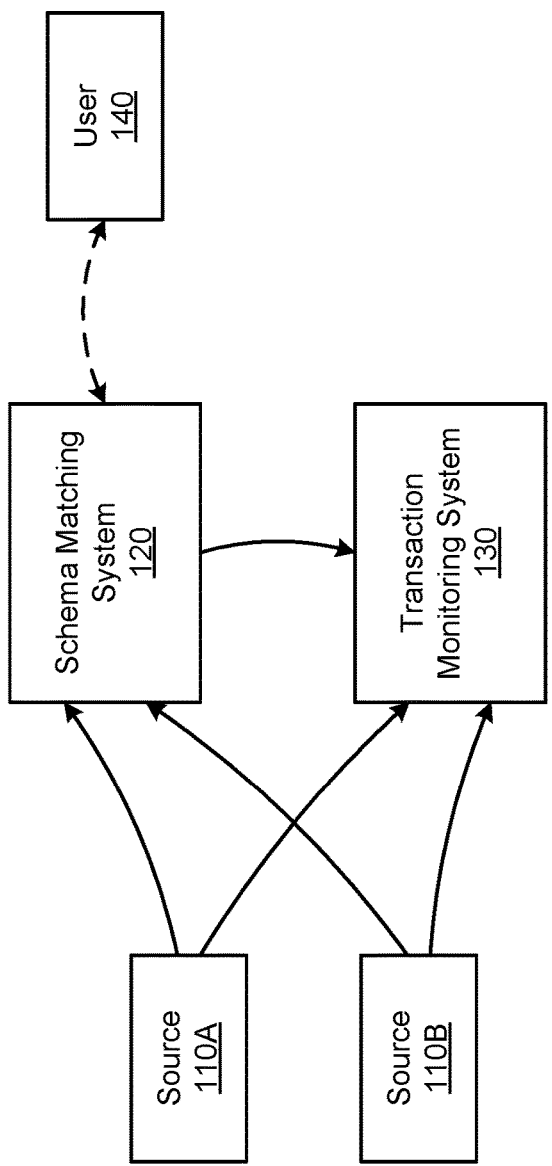
FIG. 1A is a block diagram illustrating a system environment in which a schema matching system operates, according to an embodiment.

The figures depict, and the detailed description describes, various non-limiting embodiments for purposes of illustration only. One skilled in the art will readily recognize from the following discussion that alternative embodiments of the structures and methods illustrated herein may be employed without departing from the principles described herein.

The figures use like reference numerals to identify like elements. A letter after a reference numeral, such as "110A," indicates the text refers specifically to the element having that particular reference numeral. A reference numeral in the text without a following letter, such as "102," refers to any or all of the elements in the figures bearing that reference numeral (e.g., "110" in the text refers to reference numerals "110A" and "110B" in the figures).

DETAILED DESCRIPTION

System Architecture

FIG. 1A illustrates a system environment in which a schema matching system operates, according to an embodiment. The environment 100 of FIG. 1A includes sources 110A and 110B, a schema matching system 120, a transaction monitoring system 130, and a user 140. As described above, the schema matching system 120 can receive and analyze data from the sources 110 to generate correspondence rules (or other associations) relating the data received from source 110A to the data received from source 110B. The generated correspondence rules can be later used by the transaction monitoring system 130 when received incoming data from the sources 110A and 110B.

Here, the sources 110A and 110B are databases, computing systems, third party vendors, sensors, or other sources of data outputting information in a specific schema or format. In some embodiments, the sources 110A and 110B are internal systems or are otherwise operated by the same entity operating the schema matching system 120 and/or the transaction monitoring system 130, however, the sources 110A and 110B can also be externally operated, such as in the case of data provided by an external partner, client, or vendor. In some embodiments, the sources 110A and 110B provide data to the schema matching system 120 and the transaction monitoring system 130 about the state or processing of one or more transactions. In other embodiment, the schema matching system 120 and transaction monitoring system 130 can receive and/or analyze event data from any number of sources (not just the two sources shown in FIG. 1A).

As used herein, a transaction is one or more related steps performed for the purpose of achieving a certain result. For example, a transaction may be tracking a package or item through several intermediate stops in transit or transferring funds from a first account to a second account. In some embodiments, each step towards the result of a transaction is performed by a source 110 which passes information about the transaction the transaction monitoring system 130 to keep a record of the transaction. In the fund transfer example, one source 110 may be the account holder's bank, while another source 110 can be a third party that evaluates fraud and money laundering characteristics. However, as described above, sources 110 may be controlled by the same entity as the transaction monitoring system 130 (for example, a source 110 may represent a system such as a back-end database or a legacy accounts management system).

In some implementations, the sources 110 generate "events" recording the completion of steps of the transaction or other information relevant to the transaction. An event can capture the state of the processing at a particular point, such as upon entry of a request to a source 110 or at intermediate processing steps at a source 110. For example, an event generated by a source 110 can capture the state of the transaction when the event occurred. The sources can generate events in any suitable format, such as discrete data packages, data entries, and spreadsheet or table entries.

For example, tracking a package may involve events such as received shipping manifests and/or arrival scans from several intermediate locations. Similarly, the transfer of funds from the first account to the second account can involve events recording a validation that the first and second accounts exist, a verification that the user that initiated the transfer is authorized to make the request, a check if the first account has sufficient funds for the transfer, a determination of whether the amount of the transfer exceeds an established limit, an analysis of the transfer for characteristics of money laundering, and other similar steps. Although a financial example is discussed here, a transaction may be any type of process with suitable events and data schemas as discussed herein.

Figure 1B:
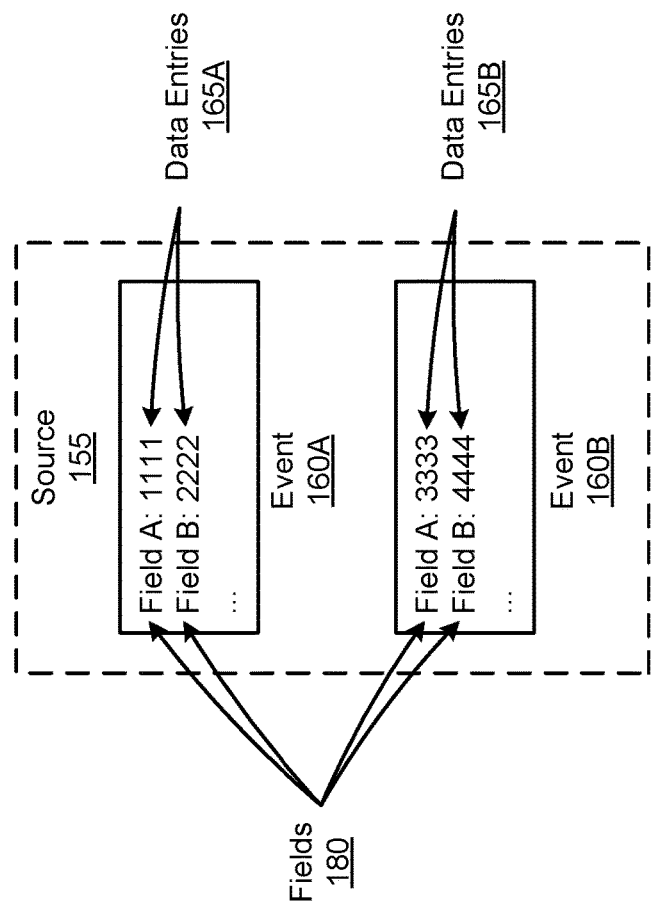
FIG. 1B is a block diagram illustrating example events received from a source, according to an embodiment.

Event data for each received event can be stored in according to varying schemas depending on, for example, the transaction associated with the event, one or more properties the particular event, or a configuration of the source 110 recording the event. FIG. 1B illustrates example events received from a source, according to an embodiment. The environment 150 of FIG. 1B includes a source 155 which has generated an event 160A including data entries 165A in a schema including fields 180, and an event 160B including data entries 165B in a schema including the fields 180. As used herein, an "event" represents a recorded state or confirmation of processing for a step of one or more transactions. For example, an event may include data entries describing a state or condition of the data after processing by the source 155. In some embodiments, an event 160 includes event data including a category of the event, processing codes, data values, and the like.

Here, the source 155 organizes events (such as the events 160A and 160B) according to a specific schema defining the organization or structure of the event data. A schema may define a set of various data labels, associated data types, and permissible values of the data for inclusion in events from the source 155, for example, events generated by the source 155 (such as the events 160A and 160B) can include data entries (such as the data entries events 165A and 165B) organized into the set of fields 180. Each of the fields 180 can have a label and an associated data type. For example, a field can have a label of "Transaction Id" and a data type "String" with permissible values of any string of characters up to a maximum length. Similarly, a schema may define a field 180 with a data label of "processing code" as an integer with permissible values in the range of 1-8. These schemas may differ across different sources 110 and across different types events generated by the sources 110. For example, the source 110A may generate events using a first schema, while source 110B generates events using a second schema with different fields 180. Typically, schemas from different sources 110 may or may not have equivalent or identical fields 180 or data labels, even if the data entries contained within the events are equivalent or have some overlap. Data entries can differ across different received events using the same schema, for example, here the data entries 165A of event 160A differ from the data entries 165B of event 160B even though the events share the same fields 180.

As described above, differing sources 110 may not readily provide information or a unified schema to identify that received events relate to the same transaction. As discussed further below, "correspondence rules" may be used to describe the relationships between the data entries of events with different schemas (for example, received from source 110A and source 110B). By applying the correspondence rules to received events related to the same transaction, the connections between the events can be captured by the transaction monitoring system 130. In some embodiments, a correspondence rule is a set of data transformations performed on a received event of a given schema which transforms the received event into a desired format. One example of a correspondence rule is a "lineage rule" which, when applied to data entries of an event, generates a "link signature" providing a record of the event in a standard format which can be compared with other link signatures to identify the relationship between the events (if one exists). For example, link signatures generated from an event from source A and an event from source 110B can be used to identify that events relate to the same transaction. Other examples of correspondence rules can transform an event received from a first source into a standard schema or into a schema used by another source.

Returning to FIG. 1A, the schema matching system 120 can analyze the schemas and characteristics of multiple sources 110 to enable the transaction monitoring system 130 to efficiently process data received from the sources 110. In some embodiments, the schema matching system 120 performs analysis to enable the transaction monitoring system 130 to request, receive, and manage data from sources 110. For example, the schema matching system 120 can generate correspondence rules to relate events received from multiple sources 110 based on events received from those sources 110. In some implementations, the analysis of the schema matching system 120 is performed with user input or review by a user (such as the user 140), for example, for compliance with regulatory requirements or to provide a quality check on the analysis of the schema matching system 120.

In the embodiment of FIG. 1A, the schema matching system 120 analyzes training events from sources 110 to identify correspondences between the schemas of the sources 110 and generate correspondence rules or other suitable information for the transaction monitoring system 130. In some embodiments, the schema matching system 120 analyzes a set of training events received from the sources 110. Training events analyzed by the schema matching system 120 can be actual events received from the sources 110, can be curated to provide a representative sample of received events, generated to simulate received events from the sources 110, or obtained by other similar methods. The schema matching system will be discussed further in relation to FIG. 3.

The transaction monitoring system 130 can receive events from one or more sources 110 and analyze the received data based on a set of correspondence rules provided by the schema matching system 120. In some embodiment, each source 110 or each set of sources 111-115 requires one or more correspondence rules for the transaction monitoring system 130 to effectively analyze. In some embodiments, the transaction monitoring system 130 operates independently of user input (such as from the user 140) or with regulatory scrutiny of the output of the transaction monitoring system 130 providing certain requirements for the outputs of the transaction monitoring system 130 (and therefore additional requirements for the correspondence rules used to generate the outputs of the transaction monitoring system 130). The transaction monitoring system 130 will be discussed further in relation to FIG. 2A.

The user 140 can interface with the schema matching system 120 through a user device or other suitable computing system. For example, the user can provide approval or confirmation of matches (for example, between events or schema fields) detected by the schema matching system 120 or to refine data received from the sources 110.

Transaction Monitoring System Overview

Figure 2A:
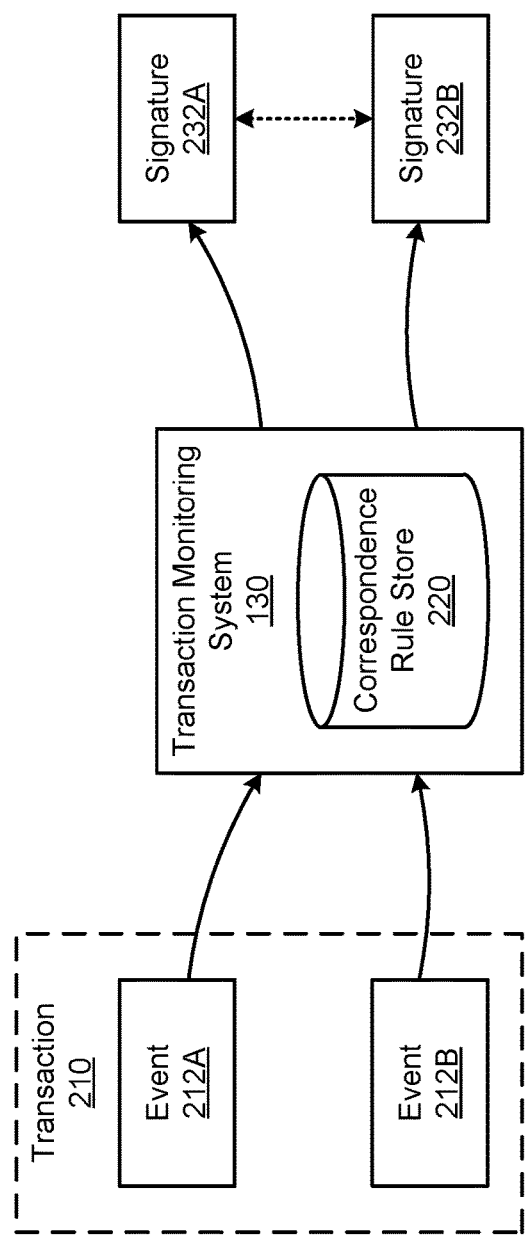
FIG. 2A is a block diagram of a transaction monitoring system, according to an embodiment.

FIG. 2A is a block diagram of a transaction monitoring system, according to an embodiment. The environment 200 of FIG. 2A includes the events 212A and 212B associated with the transaction 210, the transaction monitoring system 130 with a correspondence rule store 220 storing a set of correspondence rules for the sources of the events 212, and the signatures 232A and 232B generated by the transaction monitoring system 130. Here, the transaction monitoring system 130 can process events from multiple sources with different schemas, for example from the sources 110A and 110B.

As described above, the transaction monitoring system 130 can generate link signatures 232A and 232B for events 212A and 212B as a record of the events. For example, the generated link signatures can be used to audit the events 212A and 212B at a later date. For example, the event 212A has the corresponding signature 232A, and the signature 232B corresponds to the event 212B. In the embodiment of FIG. 2A the transaction 210 is trackable through events 212A and 212B even though events 212A and 212B have different schemas and may contain data entries that don't directly correspond.

To generate the signatures 232A and 232B, the transaction monitoring system can apply correspondence rules from the correspondence rule store 220 to each incoming event. For example, a correspondence rule can be selected for an event 212 based on the source or schema of the event 212. The generated signatures 232A and 232B can be separately stored and referenced so the transaction 210 can be later tracked. In some implementations, the generated signatures 232A and 232B based on the correspondence rules will directly correspond even though the events 212A and 212B on which they are based do not share the same schema and/or fields.

Figure 2B:
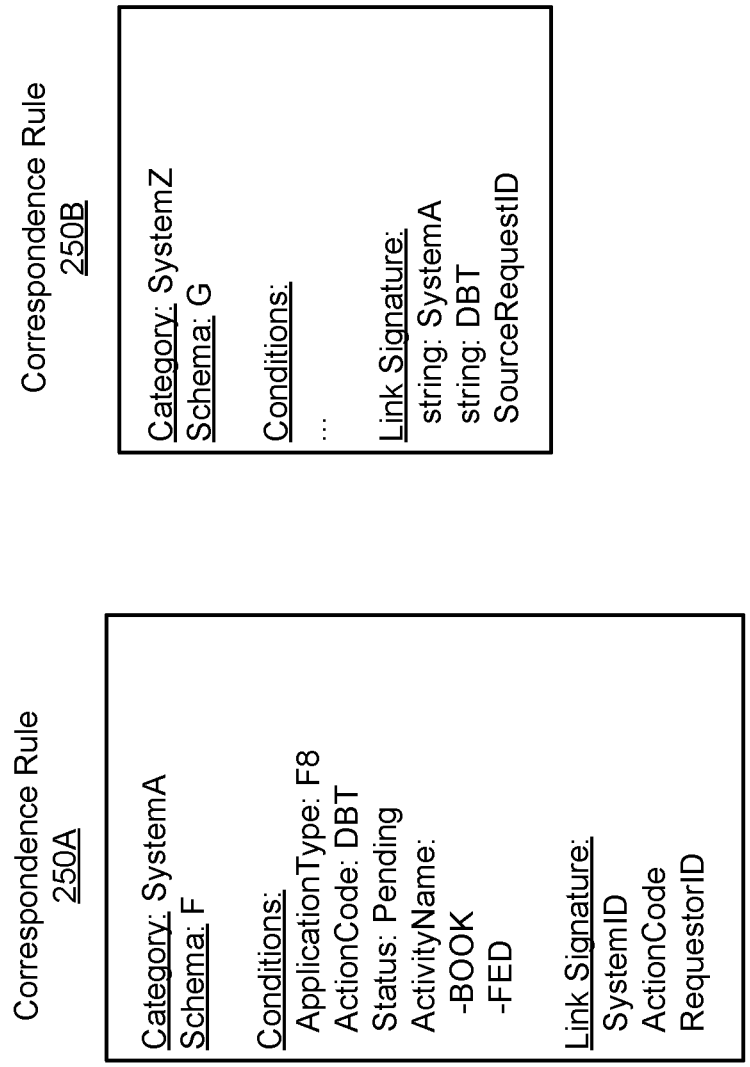
FIG. 2B illustrates example correspondence rule definitions, according to an embodiment.

As described above, the transaction monitoring system uses the set of correspondence rules to generate the signatures for each event 212 based on the specific schema of the event. FIG. 2B illustrates example correspondence rule definitions, according to an embodiment. The correspondence rules 250A and 250B are example lineage rules used to generate one or more link signatures describing the received event. For clarity, certain aspects of these correspondence rules are omitted, and additional correspondence rules may generate more, fewer, or different defined link signatures or conditions for applying the correspondence rules. Correspondence rule 250A shows a first correspondence rule for a category "SystemA" and schema "F." The category and schema may be used to filter for relevant correspondence rules, and indicate that correspondence rule 250A should be considered to evaluate for an event when the event has a category SystemA and schema F. Correspondence rule 250A further specifies various conditions for applying it to generate link signatures. In this case, the values of fields in the data schema (here, schema F) are evaluated: that an ApplicationType field has the value F8 an ActionCode field has the value DBT, a Status field has the value Pending, and an ActivityName field has values BOOK or FED. The conditions are shown here as static values, but in other circumstances may be more complex evaluations, for example accumulating values or comparing event data field values to a threshold.

The link signature for correspondence rule 250A designates the values and ordering to be used in generating the link signature for another event. In this example, the order specifies the SystemID, ActionCode, and RequestorID fields are used, in that order, for generating the link signature. These values may be selected from the data values of the Schema. In this example, the SystemID is "SystemA" and the "ActionCode" is DBT (which is known because the condition required the ActionCode field to equal DBT).

Correspondence rule 250B shows a correspondence rule for an event expected to correspond to an event using correspondence rule 250A. Here, the link signature describes the data values for generating a corresponding link signature to the link signature generated by correspondence rule 250A. However, since the correspondence rule 250B relates to a different event and different Schema (Schema G), different data fields and values may be available. For example, Schema G may have no data fields corresponding to fields of Schema F, such as the "SystemID" or "ActionCode" values. Although that data thus may not be in the Schema of the matching data event for correspondence rule 250B, these values may be designated in the correspondence rule itself. In this case, the first two data values for the link signature are defined as strings, having values "SystemA"

and "DBT." These correspond to the expected values that would be used when correspondence rule 250A uses its SystemID and ActionCode values from Schema F. By including these values in correspondence rule 250B, this rule may be used to connect related events, even when the related schema does not directly have that data in its data fields. In addition, the link signature of correspondence rule 250B includes the value of field SourceRequestID, which in Schema F corresponds to the RequstorID field. As a result, the link signature of correspondence rule 250A that uses values of [SystemID, Action Code, Requestor ID] (three values) may match the signature generated from correspondence rule 250B that values of ["SystemA", "DBT", SourceRequestID] (three values).

By appropriately designating fields of various granularity, the correspondence rules can account for different types of processes and transactions. For example, a link to represent an aggregation of all "DBT" actions from a particular system may need to represent a large number of events for the event aggregating these actions. This may be considered a "fan-in" relationship between these events, where one later event relies on many prior events. To do so in a correspondence rule, the correspondence rule may specify the type of events being aggregated, rather than refer to specific transaction identifiers. For example, the link signature may be defined as using the only the System ID or "ActionCode" fields in the rule for the event being aggregated. Likewise, the correspondence rule for the aggregating event may create a link signature for defined values (e.g., specified strings) for the relevant system and ActionCode. In this way, link signatures can be used to define such "fan-in" or "fan-out" relationships across events.

The correspondence rules may also specify additional operations for generating link signatures. For example, the correspondence rules may also specify an ordering of data field values within a data field type for the schema. For example, a schema may permit the listing of any number of data elements, such as transaction times, or a list of strings. To ensure that these values are consistent across links, the correspondence rule may specify that these values are "ordered by" a data field value or parameter. For example, strings (whichever strings are present in the event data for that field) may be "ordered by" an alphabetical ordering, or transaction times may be ordered chronologically. In addition, the correspondence rule may designate that for each separate value of a field present in the event data, a link signature is to be generated for each value. Thus, if the data specifies three strings, a link signature may be generated for each of the three strings, using each string respectively in the generation of a separate link signature.

Matching System Overview

As described above, the schema matching system 120 analyzes provided training events from sources 110 to identify correspondences between the schemas of the sources 110 and generate correspondence rules or other suitable information for use by the transaction monitoring system 130. For example, the schema matching system 120 can identify correspondences between the schemas of different sources 110 (such as corresponding fields) and generate correspondence rules relating the schemas of the sources 110. In some embodiments, the schema matching system 120 can progress through an iterative process of analysis to detect matches in the received training data set.

Figure 3:
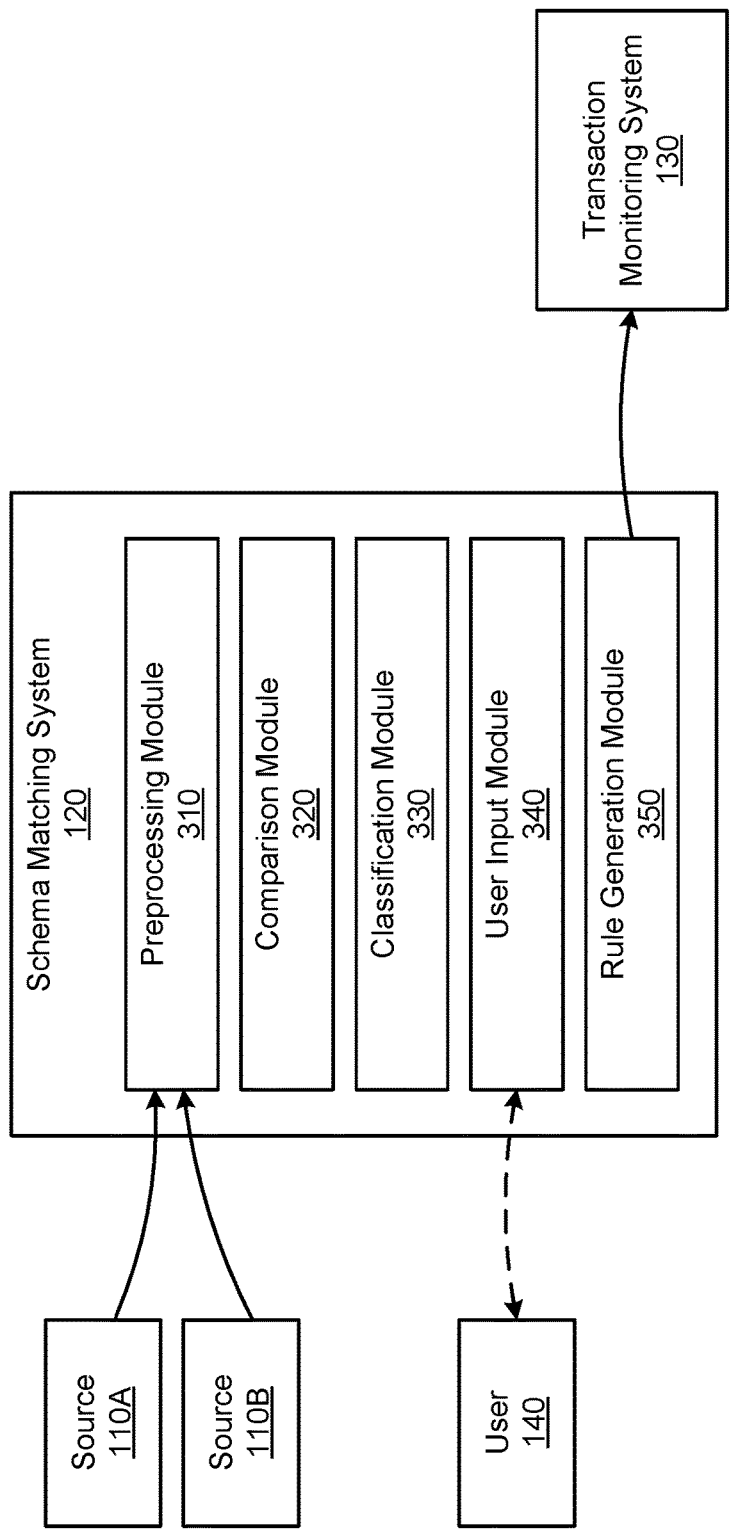
FIG. 3 is a block diagram of a schema matching system, according to an embodiment.

FIG. 3 is a block diagram of a schema matching system, according to an embodiment. The environment 300 of FIG. 3 comprises sources 110A and 110B, the schema matching system 120, the transaction monitoring system 130, and the user 140. The schema matching system 120 of FIG. 3 comprises a preprocessing module 310 in communication with the sources 110A and 110B, a comparison module 320, a classification module 330, a user input module 340 in communication with a user 140, and a rule generation module 350 which can generate and send correspondence rules to the transaction monitoring system 130.

Here, the preprocessing module 310 can receive and process training events from sources 110 for further analysis by other modules of the schema matching system 120. In some embodiments, the preprocessing module 310 can receive a training event set including statistically significant amounts of training events from each of the sources 110A and 110B, including corresponding events from both sources 110A and 110B. For example, in some embodiments approximately 500 training events are received from each of the sources 110, although the exact amount of training events needed can depend on the characteristics of the sources 110 and the expected rate of corresponding events between sources 110A and 110B in the received data set. An event from source 110A can correspond to one or more events received from source 110B (and may additionally correspond to events received from other sources).

Figure 4A:
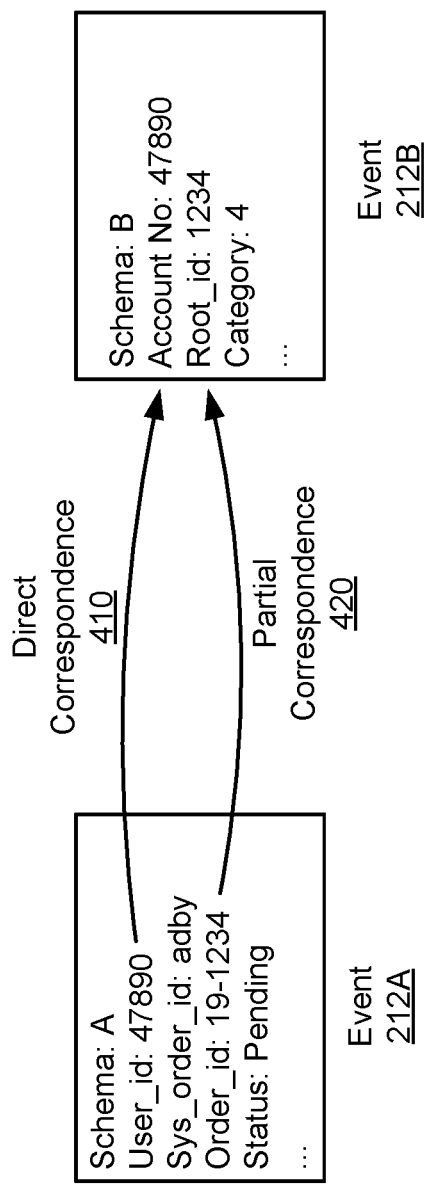
FIG. 4A illustrates example events generated by different sources, according to an embodiment.

FIG. 4A illustrates example events generated by different sources, according to an embodiment. Here, FIG. 4A shows event 212A comprising several fields that correspond with a different event B 420. Specifically, the "User_id" field of event 212A directly corresponds 430 with the "Account No" field of event 212B and the "Order_id" field of event 212A partially corresponds 440 with the "Root id" field of event 212B. In the embodiment of FIG. 4A, the event 212A and event 212B are associated with the same transaction 210 but originate from different sources (for example, event 212A from source 110A and event 212B from source 110B) and have different schemas. Therefore, even though event 212A and event 212B have different field labels and some non-overlapping data entries, many of the fields of schema A (of event 212A) correspond to the fields of schema B (for event 212B) and contain similar data about the transaction 210 associated with both the events 212A and 212B.

In some embodiments, fields of two schemas directly correspond when the data entries in each of those fields are the same across corresponding events in both schemas, even if the field names are different. For example, the "User_id" field of event 212A (and schema A) has a different field name than the "Account No" field of event 212B, however both fields are referring the same underlying information about the transaction 210 and contain the same data entry of "47890." Therefore, the "User_id" field of events with schema A (such as event 212A) directly corresponds 410 to the "Account No" field of events with schema B (such as event 212B).

Similarly, fields of two schemas can "partially correspond" when the data entry of one field is a subset of the data entry of another, or where the fields otherwise contain some overlapping information. Here, the "Order_id" field of event 212A (and schema A) and the "Root id" field of event 212B (and schema B) contain similar data entries, except for the addition of a prefix "19" to the data entry of the "Order_id" field. Therefore, the "Order_id" field of events with schema A (such as event 212A) partially corresponds 420 to the "Root id" field of events with schema B (such as event 212B). In some embodiments, a similar pattern can be expected when looking at other corresponding data entries with the same schema where the "Order_id" field contains the same data as the "Root id" field with an appended prefix.

Returning to FIG. 3, the preprocessing module 310 can perform a set of preprocessing operations on the received training events which can include pre-labeling, blocking, or normalizing the received training events. In some embodiments, the preprocessing operations are set based on previous iterations of analysis by the schema matching system 120 on the training event data and/or based on user input.

In some embodiments, the preprocessing module 310 can label a specific field of source 110A as corresponding to a specific field of source 110B based on a previous analysis by the schema matching system 120 or based on specific user input that the fields are corresponding. For example, if the schema matching system 120 previously identified that the "User_id" field of events from source 110A (such as event 212A) directly corresponds 410 to the "Account No" field of events from source 110B (such as event 212B) in a previous round of analysis, the preprocessing module 310 can set this assumption for the current round of analysis.

Figure 4B:
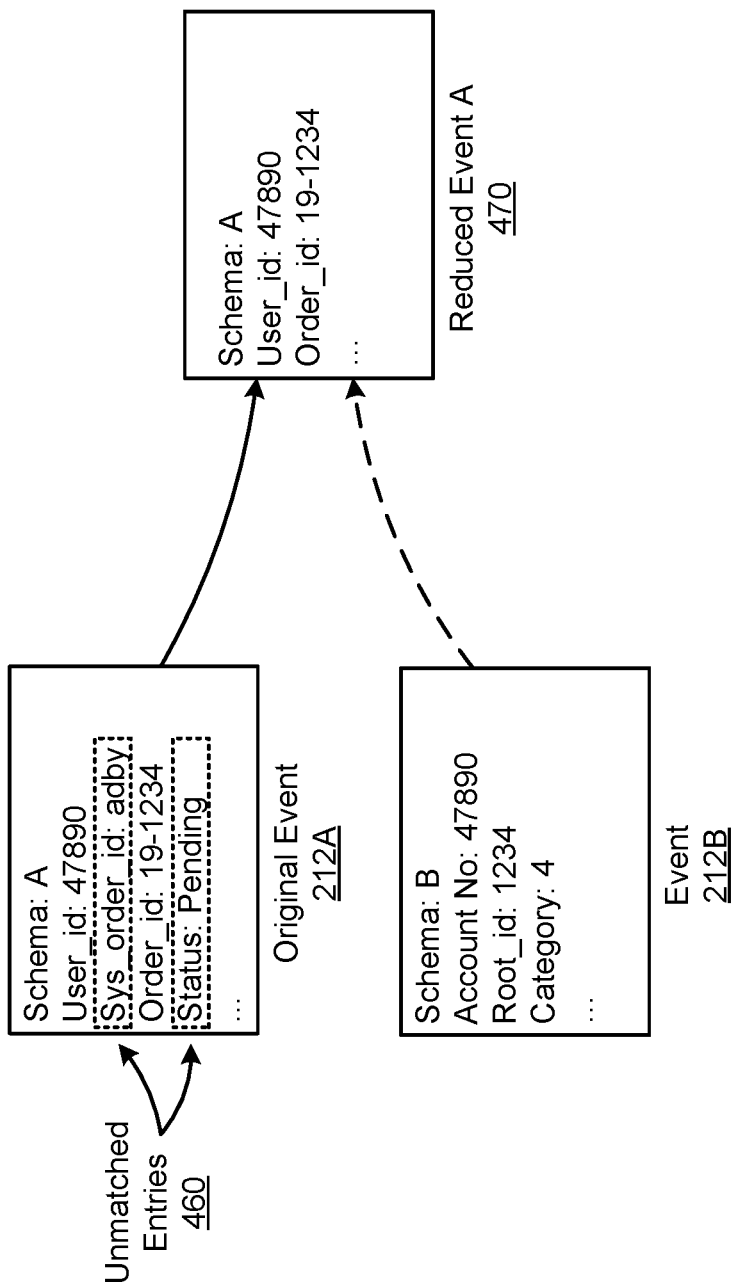
FIG. 4B illustrates an example event with reduced dimensionality for analysis by the matching system, according to an embodiment.

Similarly, the preprocessing module 310 can block off certain fields of the schema of sources 110A or 110B, removing those fields from further analysis by the schema matching system 120. For example, a user could manually block off fields that will not correspond to fields in other schemas (such as a field identifying the name of the source 110 or fields with values calculated by the source 110 that aren't used by other sources 110) to reduce the dimensionality of the dataset for the schema matching system 120 to analyze. Here, FIG. 4B illustrates an example event with reduced dimensionality for analysis by the matching system, according to an embodiment. FIG. 4B comprises the original event 212A with comprises several unmatched entries 460 which do not have counterparts in a corresponding event 212B, and a reduced event A 470.

In the embodiment of FIG. 4B, the unmatched entries 460 (in the "Sys_order_id" and "Status" fields) have no counterparts in the corresponding event 212B. Therefore, the preprocessing module 310 can block off the unmatched entries (for example, based on user input via the user input module 340) in schema A to generate the reduced event 470 which contains less data for the matching system 120 to analyze, but retains the fields which correspond to the event 212B. When the blocking is applied to all received events with schema A (for example, all events from source 110A) the size of the search space to analyze and the resulting computations necessary by the schema matching system 120 can be reduced. In some implementations, blocking is applied to unmatched fields after an initial iteration of the event matching process in which the unmatched fields are identified.

In some embodiments, the preprocessing module 310 can apply one or more "normalization rules" to the received training events to improve the similarity between corresponding data entries across different schemas. As used herein, a normalization rule is a data manipulation associated with one or more fields of a schema to be performed on data entries of received events associated with that schema. For example, a normalization rule can remove specific characters of a data entry (for example, to eliminate a specific prefix, suffix, or formatting character), add one or more characters, round a numerical data entry to a specific precision, or convert a data entry to a standard format (such as a phonetic representation). In some embodiments, the generated normalization rules are applied by the preprocessing module 310 as data entries are received from the sources 110.

Returning to FIG. 3, the comparison module 320 can compare the data entries of each event from source 110A with the data entries of events received from source 110B. As described above, the received training event set from each source 110 can be preprocessed by the preprocessing module 310 before analysis by the comparison module 320. Each data entry of a received training event can be compared to a set of potentially corresponding data entries associated with events received from another source 110. In some embodiment, each data entry of the training event set from source 110A is compared to each data entry associated with the training event set from source 110B, however, other embodiments can reduce the amount of comparisons required by, for example, only comparing data entries with matching data types.

To compare two data entries, the comparison module 320 can use one or more distance algorithms to calculate a similarity metric (for example, a metric based on a string distance for strings or a metric based on a difference between numbers) between the two data entries. In some implementations, the distances calculated between two data entries are represented by a value between from 0 to 1, where 1 represents the highest possible similarity (for example, the data entries are duplicates) and 0 represents the lowest possible similarity. FIG. 5 illustrates example similarity metrics between data entries, according to an embodiment. Here, FIG. 5 shows a direct match between the entry 510A and the direct match 515A, a partial match between the entry 510B and the partial match 515B, and a phonetic match between entry 510C and the phonetic match 515C.

Here, the entry 510A and the direct match 515A are duplicate strings with no differences. In some embodiments, a comparison between the entry 510A and the direct match 515A results in a value of 1 (i.e. the highest possible similarity).

In contrast, in the case of a partial match such as the match between the entry 510B and the partial match 515B, the two data entries being compared are related but not identical. Here, the entry 510B and the partial match 515B share many substrings and common characters, but an additional character (the dash) has been inserted into the partial match 515B and the order of some characters has been changed.

In some implementations, the comparison module 320 uses a "Jaro-Winkler similarity" metric (based on a normalized Jaro-Winkler distance) to determine the similarity between different data entries. Implementations of Jaro-Winkler similarity can bias towards strings that match from the beginning (up to a specific prefix length) and can be based on a number of detected "matching" characters in the string (identical characters within a certain range of each other). For example, the comparison module 320 might calculate that the entry 510B and the partial match 515B have 7 matching characters and a length 1 matching prefix, and use those statistics to calculate the resulting Jaro-Winkler similarity metric.

In some embodiments, the comparison module 320 uses other similarity metrics to determine the similarity between two data entries. For example, the comparison module 320 can use a similarity metric based on the "Levenshtein distance" measuring the difference between two sequences based on the minimum number of single-character edits (insertions, deletions or substitutions) required to change one data entry into the other. For example, the comparison module 320 might determine that the entry 510B and the partial match 515B require 3 single-character edits to go from one to the other and calculate a similarity metric based on the Levenshtein distance. Similarly, a similarity metric can be based on the related "Damerau-Levenshtein distance"

which additionally allows for transpositions between characters in addition to the single-character insertions, deletions or substitutions.

Further, a similarity metric can be determined based on other suitable relationships between the two data entries (not necessarily a string distance or other distance algorithm). In some embodiments, a similarity metric can be based on the longest common subsequence between two data entries (unlike substrings, subsequences are not required to occupy consecutive positions within the original sequences). For example, the entry 510B and the partial match 515B have a longest common subsequence of 7, despite the addition of the dash and the removal of the "B" in the partial match 515B.

In other embodiments, the comparison module 320 can determine similarity between two data entries based on a phonetic match between the data entries. For example, the entry 510C and the phonetic match 515C can be determined to correspond based on a phonetic analysis (that when spoken, the two data entries would be pronounced similarly despite being spelled differently). Some implementations can use the phonetic algorithm "Soundex" which encodes homophones using the same representation so that they can be matched despite minor differences in spelling. Similarly, other natural language processing techniques can be used to determine similarity metrics and detect matches between different data entries.

In some embodiments, the classification module 330 of FIG. 3 determines one or more matching fields between schemas associated with different sources 110 based on the determined similarity metrics between data entries of received training events from the sources 110. The classification module 330 can use one or more machine learning techniques, such as machine learning clustering algorithms and/or probabilistic record linkage techniques to determine corresponding events received from different sources 110 and corresponding fields in the schemas associated with the sources 110.

FIG. 6A illustrates an example match between two events, according to an embodiment. In some embodiments, after the classification module 330 applies machine learning techniques to determine a set of matching events and a set of corresponding fields (for example, based on associating the field of the matching data entries) the matched events may not be identical. For example, the initial match 610 of FIG. 6A is a match between an initial pair A 620 of events from different sources (the event A 622 and the event B 624 as shown in FIG. 6A). Here, while some data entries of the event A 622 correspond to some data entries of the event B 624 many of the correspondences are not exact matches (as shown by the similarity score being less than 1.0 in this embodiment). For example, the account ID for event A 622 "ABC123456" has been matched with the data entry "000123456" of event B 624 with a similarity of 0.82 (but the data entries are not an exact match).

In some embodiments, if the fields of a first schema (such as the schema of event A 622) and a second schema (such as the schema of event B 624) correspond, the discrepancies between corresponding data entries of the schemas should follow a predictable pattern. For example, the account ID for event A 622 "ABC123456" and the corresponding data entry of event B 624 "000123456" would be an exact match if the first three characters of each data entry were removed. Therefore, if each data entry for the "account ID" field of the schema of event A 622 and the corresponding field of the schema of event B 624 had the first three characters removed, theoretically any corresponding data entries should be a direct match (where the data entries are identical).

In some implementations, the classification module 330 generates one or more normalization rules (which can be applied to received events to improve the similarity between corresponding data entries across different schemas as discussed above). In some embodiments, the generated normalization rules are applied by the preprocessing module 310 as data entries are received from the sources 110. Normalization rules can be applied to data entries of one or both corresponding fields depending on the specific schemas involved. For example, the "account ID" field of the schema of event A 622 and the corresponding field of the schema of event B 624 can both be associated with a normalization rule to "remove the first three characters," which will result in a direct match between the data entries of the event A 622 and the event B 624 of the initial pair 620.

FIG. 6B illustrates an example normalized match between two events, according to an embodiment. The normalized match 630 of FIG. 6B is a match between a normalized pair 640 of events (the initial pair 620 after the application of several normalization rules) including the normalized event A 642 and the normalized event B 644. Here, while some matched data entries of initial pair 620 were not exact matches (as shown by the similarity score being less than 1.0 in the initial match 610), the matched data entries of the normalized match 630 are all direct matches. For example, the normalized account ID for event A 622 "123456" directly matches with the data entry "123456" of event B 624 with a similarity of 1.0 after the application of the normalization rule described above. Normalization rules can be generated using any suitable method, such as iteratively (to increase a calculated similarity between matching data entries) or based on user input.

Returning to FIG. 3, the user input module 340 can solicit and receive feedback from a user 140 on matches or pairs of events (such as the initial match 610 and the normalized match 630), corresponding fields, normalization rules and/or correspondence rules. In some embodiments, the generated correspondence rules are used in environments with a small margin for error, such as in industries with regulatory review of the records generated using the correspondence rules. A user 140 can approve or confirm one or more matches or field correspondences and/or instruct the schema matching system 120 to perform an additional iteration on the received training data to further refine the normalization rules or the confidence of the system in the generated matches.

The rule generation module 350 can generate one or more correspondence rules based on the matching fields and normalization rules discovered by the schema matching system. In some embodiments, the generated correspondence rules are transmitted to a transaction monitoring system 130 for use on incoming source data. The correspondence rules may be stored as a structured mark-up language, script or language or other form. For example, in various embodiments the correspondence rules may be stored as YAMML or JSON.

The correspondence rules may define a set of conditions for defining which event data the correspondence rules apply to. When a received event matches these conditions, the correspondence rule is applied that event. The conditions for applying a correspondence rule may identify a data schema or processing system from which the event data was received. The conditions may also include an event type, or a data field value for a particular data item in the event data. These conditions may be particular to the schema designated by the correspondence rule. For example, the correspondence rule may specify that it relates to SchemaA when the value for field "ActivityName" in SchemaA has a value of "BOOK."

Matching Process

Figure 7:
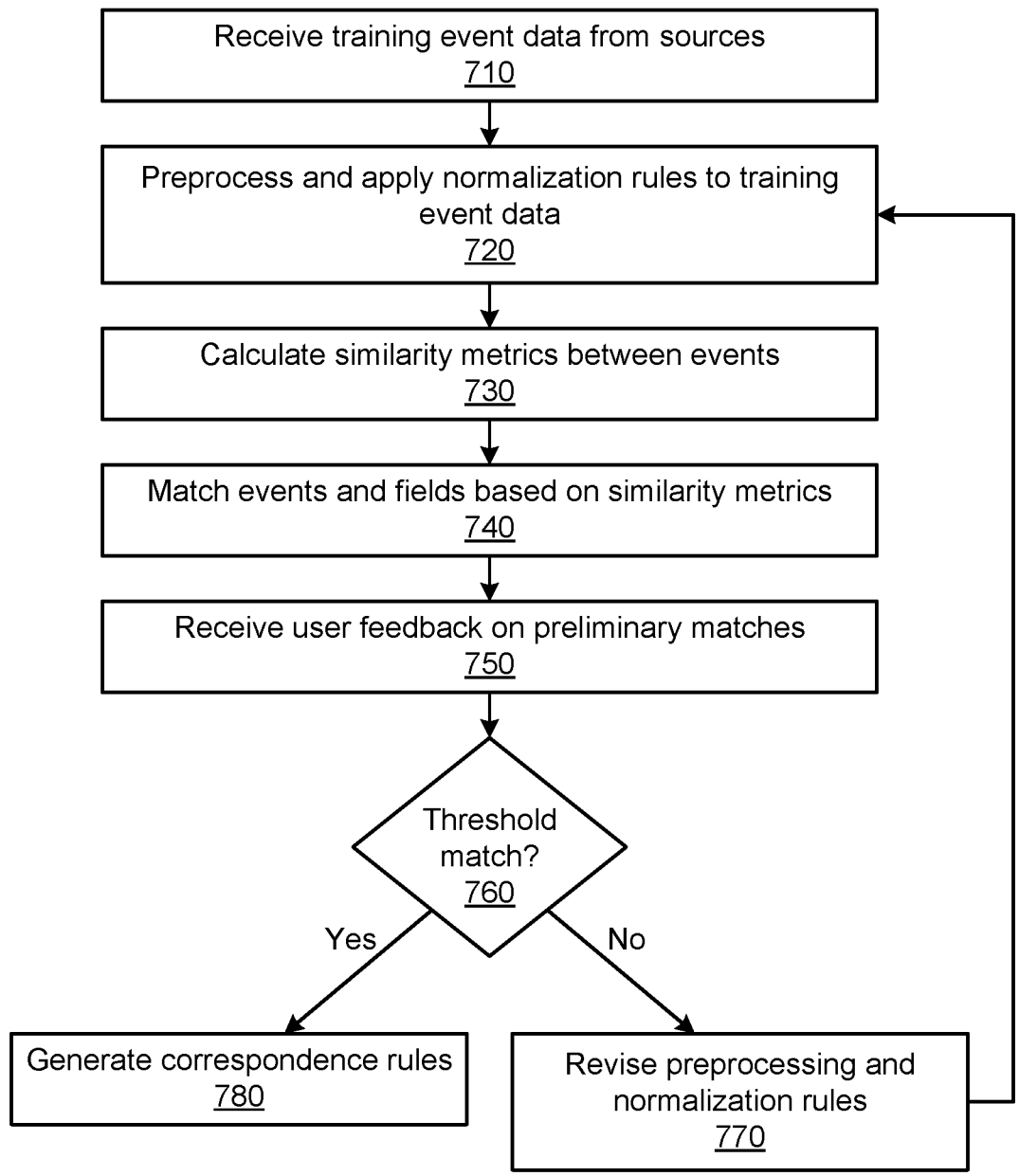
FIG. 7 is a flowchart illustrating an example process for generating a set of correspondence rules based on received source data, according to an embodiment.

FIG. 7 is a flowchart illustrating an example process for generating a set of correspondence rules based on received source data, according to an embodiment. here, the process 700 begins when the schema matching system receives 710 training event data from multiple sources comprising events associated with multiple schemas. For example, each source can be associated with one or more different schemas than each other source. The schema matching system can then prepare the training event data for analysis by preprocessing 720 and applying normalization rules (if any exist) to the training event data of each schema before further analysis. Then, the schema matching system calculates 730 one or more similarity metrics between data entries of the training event data (for example, using the similarity metrics described above). Using the calculated similarity metrics, the schema matching system can match 740 events (for example, based on multiple similar data entries in two matching events) and, in some embodiments based on the pairs of matching events, corresponding schema fields across schemas. In the embodiment of FIG. 7, the schema matching system can receive 750 user feedback, such as confirmation of matching events and/or corresponding schema fields. Based on the user feedback and/or the quality of the matching events, the schema matching system 120 can determine if a threshold match is achieved 760. If no threshold match is achieved (for example, if matching events aren't above a threshold similarity and more specific or additional normalization rules are needed), the schema matching system 770 can revise existing normalization rules or generate new normalization rules (in some embodiments with or based on user input). After the revision of the normalization rules, the process can iteratively continue from step 720 with the application of the updated normalization rules to the training event data and further analysis of the same. However, if a threshold match is determined, the schema matching system can generate 780 one or more correspondence rules (for example, based on the normalization rules) for later use by one or more transaction monitoring systems on incoming event data.

Example Computing System

Figure 8:
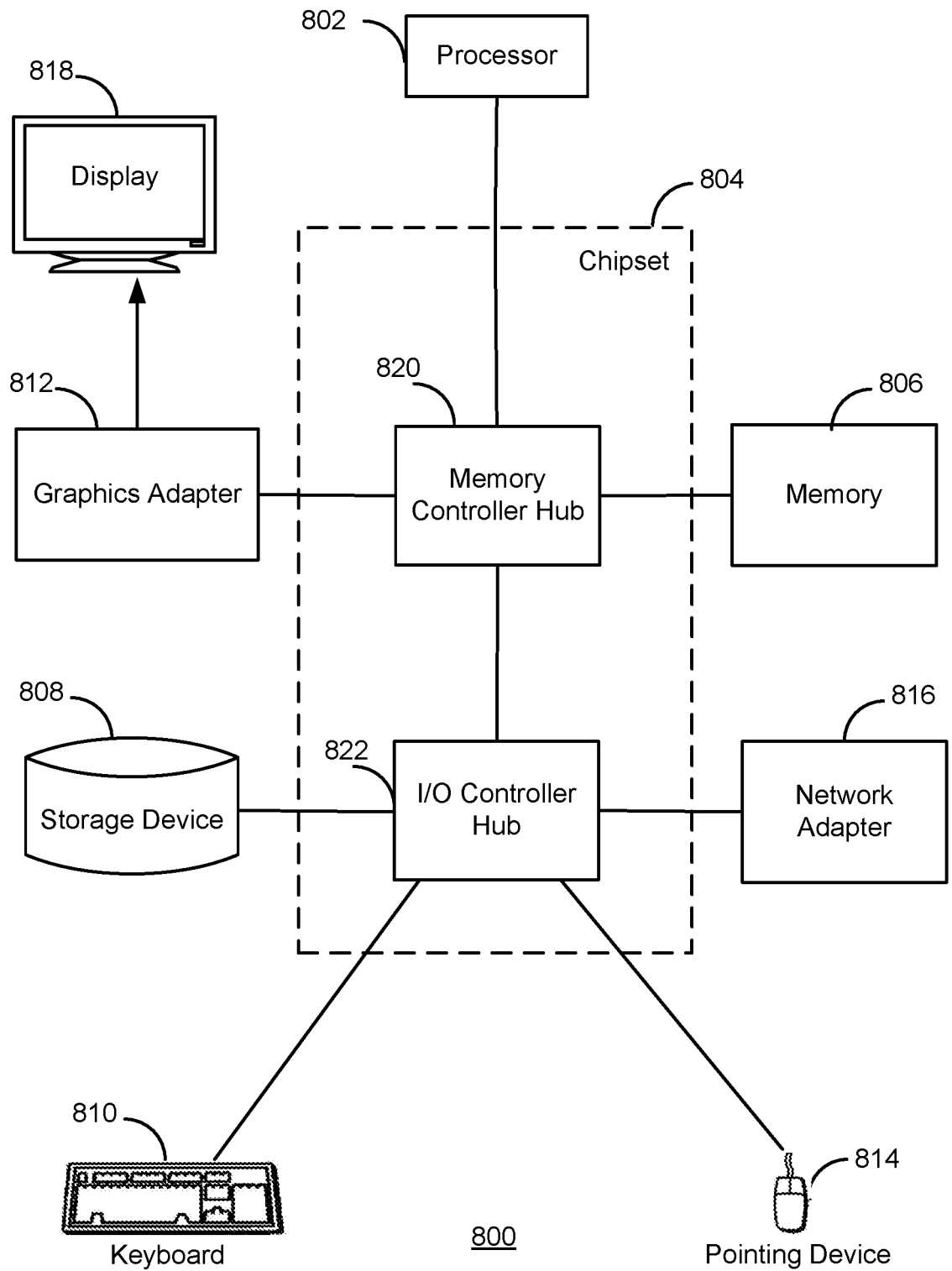
FIG. 8 is a block diagram illustrating a functional view of a typical computer system for use as one of the systems illustrated in the environment of FIG. 2 in accordance with one embodiment.

FIG. 8 is a block diagram illustrating a functional view of a typical computer system 800 for use as one of the systems illustrated in the environment 100 of FIG. 1 in accordance with one embodiment. Illustrated are at least one processor 802 coupled to a chipset 804. Also coupled to the chipset 804 are a memory 806, a storage device 808, a keyboard 810, a graphics adapter 812, a pointing device 814, and a network adapter 816. A display 818 is coupled to the graphics adapter 812. In one embodiment, the functionality of the chipset 804 is provided by a memory controller hub 820 and an I/O controller hub 822. In another embodiment, the memory 806 is coupled directly to the processor 802 instead of the chipset 804.

The storage device 808 is a non-transitory computer-readable storage medium, such as a hard drive, compact disk read-only memory (CD-ROM), DVD, or a solid-state memory device. The memory 806 holds instructions and data used by the processor 802. The pointing device 814 may be a mouse, track ball, or other type of pointing device, and is used in combination with the keyboard 810 to input data into the computer system 800. The graphics adapter 812 displays images and other information on the display 818. The network adapter 816 couples the computer system 800 one or more networks. Some embodiments of the computer system 800 have different and/or other components than those shown in FIG. 8.

The computer 800 is adapted to execute computer program modules for providing the functionality described herein. As used herein, the term "module" to refers to computer program instruction and other logic for providing a specified functionality. A module can be implemented in hardware, firmware, and/or software. A module is typically stored on the storage device 808, loaded into the memory 806, and executed by the processor 802.

A module can include one or more processes, and/or be provided by only part of a process. Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

The types of computer systems 800 used by the systems of FIG. 8 can vary depending upon the embodiment and the processing power used by the entity. Further, the foregoing described embodiments have been presented for the purpose of illustration; they are not intended to be exhaustive or to limiting to the precise forms disclosed. Persons skilled in the relevant art can appreciate that many modifications and variations are possible in light of the above disclosure.

Conclusion

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, described modules may be embodied in software, firmware, hardware, or any combinations thereof.

Reference in the specification to "one embodiment" or to "an embodiment" means that a particular feature, structure, or characteristic is included in at least one embodiment of the disclosure. The appearances of the phrase "in one embodiment" or "a preferred embodiment" in various places in the specification are not necessarily referring to the same embodiment.

Some portions of the above are presented in terms of methods and symbolic representations of operations on data bits within a computer memory. These descriptions and representations are the means used by those skilled in the art to most effectively convey the substance of their work to others skilled in the art. A method is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects disclosed herein include process steps and instructions described herein in the form of a method. It should be noted that the process steps and instructions described herein can be embodied in software, firmware or hardware, and when embodied in software, can be downloaded to reside on and be operated from different platforms used by a variety of operating systems.

The embodiments discussed above also relates to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The methods and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the embodiments are not described with reference to any particular programming language. It will be appreciated that a variety of programming languages may be used to implement the teachings described herein, and any references below to specific languages are provided for disclosure of enablement and best mode.

While the disclosure has been particularly shown and described with reference to a preferred embodiment and several alternate embodiments, it will be understood by persons skilled in the relevant art that various changes in form and details can be made therein without departing from the spirit and scope of the invention.

Finally, it should be noted that the language used in the specification has been principally selected for readability and instructional purposes, and may not have been selected to delineate or circumscribe the inventive subject matter. Accordingly, the disclosure is intended to be illustrative, but not limiting, of the scope of the invention.

What is claimed is:

1. A method comprising:
    retrieving a first set of events associated with a first source, each event of the first set of events comprising a set of data entries organized in a first schema comprising a first set of fields;
    retrieving a second set of events associated with a second source, each event of the second set of events comprising a set of data entries organized in a second schema comprising a second set of fields, the second set of fields distinct from the first set of fields; and
    determining a correspondence between the first schema and the second schema by:
        calculating a similarity metric for each of a plurality of data entry pairs, each data entry pair comprising a first data entry of an event of the first set of events and a second data entry of an event of the second set of events, the similarity metric for a data entry pair representing a difference between the first and second data entries of the data entry pair;
        identifying, based on the calculated similarity metrics for the plurality of data entry pairs, a match between a first event of the first set of events and a second event of the second set of events, the match associating one or more data entries of the first event with one or more data entries of the second event; and
        generating a correspondence rule based on the match, the correspondence rule defining a relationship between the a first field of the first set of fields and a second field of the second set of fields.

2. The method of claim 1, wherein one or more events of the first set of events and one or more events of the second set of events are associated with a transaction processed at least in part by the first source and the second source.

3. The method of claim 1, wherein the similarity metric for a data entry pair is a string distance between the first data entry and the second date entry of the data entry pair.

4. The method of claim 3, wherein the string distance is a Jaro-Winkler string distance.

5. The method of claim 1, wherein the similarity metric for a data entry pair is based on a phonetic similarity between the first data entry and the second date entry of the data entry pair.

6. The method of claim 1, wherein identifying a match between a first event of the first set of events and a second event of the second set of events comprises:
    applying a clustering algorithm to the first and second set of events based on the calculated similarity metrics.

7. The method of claim 1, wherein the correspondence rule is a lineage rule which, when applied to an event, generates a link signature providing a record of the event in a standardized format.

8. The method of claim 1, wherein determining a correspondence between the first schema and the second schema further comprises receiving, from a user, user feedback confirming the match.

9. The method of claim 1, wherein retrieving a first set of events associated with a first source comprises applying one or more normalization rules to the data entries of each event of the first set of events.

10. A non-transitory computer readable storage medium comprising instructions which, when executed by a processor, cause the processor to perform the steps of:
    retrieving a first set of events associated with a first source, each event of the first set of events comprising a set of data entries organized in a first schema comprising a first set of fields;
    retrieving a second set of events associated with a second source, each event of the second set of events comprising a set of data entries organized in a second schema comprising a second set of fields, the second set of fields distinct from the first set of fields; and determining a correspondence between the first schema and the second schema by:

calculating a similarity metric for each of a plurality of data entry pairs, each data entry pair comprising a first data entry of an event of the first set of events and a second data entry of an event of the second set of events, the similarity metric for a data entry pair representing a difference between the first and second data entries of the data entry pair;

identifying, based on the calculated similarity metrics for the plurality of data entry pairs, a match between a first event of the first set of events and a second event of the second set of events, the match associating one or more data entries of the first event with one or more data entries of the second event; and generating a correspondence rule based on the match, the correspondence rule defining a relationship between the a first field of the first set of fields and a second field of the second set of fields.

11. The non-transitory computer readable storage medium of claim 10, wherein one or more events of the first set of events and one or more events of the second set of events are associated with a transaction processed at least in part by the first source and the second source.

12. The non-transitory computer readable storage medium of claim 10, wherein the similarity metric for a data entry pair is a string distance between the first data entry and the second date entry of the data entry pair.

13. The non-transitory computer readable storage medium of claim 12, wherein the string distance is a Jaro-Winkler string distance.

14. The non-transitory computer readable storage medium of claim 10, wherein the similarity metric for a data entry pair is based on a phonetic similarity between the first data entry and the second date entry of the data entry pair.

15. The non-transitory computer readable storage medium of claim 10, wherein identifying a match between a first event of the first set of events and a second event of the second set of events comprises:

applying a clustering algorithm to the first and second set of events based on the calculated similarity metrics.

16. The non-transitory computer readable storage medium of claim 10, wherein the correspondence rule is a lineage rule which, when applied to an event, generates a link signature providing a record of the event in a standardized format.

17. The non-transitory computer readable storage medium of claim 10, wherein determining a correspondence between the first schema and the second schema further comprising receiving, from a user, user feedback confirming the match.

18. The non-transitory computer readable storage medium of claim 10, wherein retrieving a first set of events associated with a first source comprises applying one or more normalization rules to the data entries of each event of the first set of events.

19. A system comprising:

a processor; and a non-transitory computer readable storage medium comprising instructions which, when executed by the processor, cause the processor to perform the steps of:

retrieving a first set of events associated with a first source, each event of the first set of events comprising a set of data entries organized in a first schema comprising a first set of fields;

retrieving a second set of events associated with a second source, each event of the second set of events comprising a set of data entries organized in a second schema comprising a second set of fields, the second set of fields distinct from the first set of fields; and determining a correspondence between the first schema and the second schema by:

calculating a similarity metric for each of a plurality of data entry pairs, each data entry pair comprising a first data entry of an event of the first set of events and a second data entry of an event of the second set of events, the similarity metric for a data entry pair representing a difference between the first and second data entries of the data entry pair;

identifying, based on the calculated similarity metrics for the plurality of data entry pairs, a match between a first event of the first set of events and a second event of the second set of events, the match associating one or more data entries of the first event with one or more data entries of the second event; and generating a correspondence rule based on the match, the correspondence rule defining a relationship between the a first field of the first set of fields and a second field of the second set of fields.

20. The system of claim 19, wherein one or more events of the first set of events and one or more events of the second set of events are associated with a transaction processed at least in part by the first source and the second source.

* * * * *